United States Patent [19]

Adcock

[11] Patent Number: 4,654,809

[45] Date of Patent: Mar. 31, 1987

[54] NOISE CORRECTED POLE AND ZERO ANALYZER

[75] Inventor: James L. Adcock, Marysville, Wash.

[73] Assignee: Hewlett-Packard Company, Palo Alto, Calif.

[21] Appl. No.: 644,307

[22] Filed: Aug. 23, 1984

[51] Int. Cl.⁴ .................... G06F 15/20; G06F 11/00
[52] U.S. Cl. ................................ 364/553; 364/572; 371/24; 375/14
[58] Field of Search ............... 364/553, 724, 725, 825, 364/827, 572; 375/13, 14, 18; 371/24, 25

[56] References Cited

U.S. PATENT DOCUMENTS

| | | | |
|---|---|---|---|
| 3,586,846 | 6/1971 | Ley | 364/553 |
| 3,643,073 | 2/1972 | Sawamura | 364/553 |
| 3,973,112 | 8/1976 | Sloane | 364/553 |
| 4,122,529 | 10/1978 | Hoech | 364/553 X |
| 4,328,552 | 5/1982 | Stovall | 364/553 X |
| 4,352,160 | 9/1982 | Frech | 364/553 |
| 4,354,177 | 10/1982 | Sloane | 364/553 X |
| 4,375,692 | 3/1983 | Shensa et al. | 364/553 X |
| 4,397,029 | 8/1983 | Satorius et al. | 364/553 X |

Primary Examiner—Errol A. Krass
Assistant Examiner—Kevin J. Teska
Attorney, Agent, or Firm—Douglas A. Kundrat

[57] ABSTRACT

A pole and zero analyzer determines the poles and zeroes of a device by applying a stimulus signal to the device, detecting the stimulus and response signals and computing the auto- and cross spectra. An estimated transfer function comprising a rational fraction of two Chebyshev polynomials is least squares fit to a measured transfer function obtained from the auto- and cross-spectra and the poles and zeroes are obtained as the roots of the estimated transfer function. Inaccuracies due to noise and computational error are minimized by the use of the Chebyshev polynomials.

8 Claims, 15 Drawing Figures $X(f) \rightarrow \boxed{H_{MD}(f)} \rightarrow \oplus \rightarrow Y(f)$
$\uparrow N_F(f)$

*FIG 5*

$$\tilde{P} = \begin{bmatrix} \tilde{P}_1 \\ \tilde{P}_2 \\ \vdots \\ \tilde{P}_m \end{bmatrix}, \quad \tilde{Q} = \begin{bmatrix} \tilde{Q}_1 \\ \tilde{Q}_2 \\ \vdots \\ \tilde{Q}_n \end{bmatrix}, \quad C = \begin{bmatrix} c_0 \\ c_1 \\ \vdots \\ c_m \end{bmatrix}, \quad D = \begin{bmatrix} d_0 \\ d_1 \\ \vdots \\ d_n \end{bmatrix},$$

$$\Theta = \varnothing = \begin{bmatrix} \Theta_{j0} & \Theta_{j1} & \cdots & \Theta_{jm} \end{bmatrix}$$

*FIG 9*

$$\begin{bmatrix} G & -H \\ -H^T & F \end{bmatrix} \begin{bmatrix} D \\ C \end{bmatrix} = 0$$

*FIG 10*

NOISE CORRECTED POLE AND ZERO ANALYZER

BACKGROUND AND SUMMARY OF THE INVENTION

The transfer function of a linear device describes the behavior of the device in the Laplace transform (s-plane) domain in response to an applied stimulus. In the design of electrical, mechanical or electromechanical devices it is often important to know the location and strength of each pole and zero of the device transfer function in the s-plane so that the device may be optimized for a desired application. In particular, where device stability is important, knowledge of pole locations is critical. In order for the pole and zero measurement to be of use to the device designer, it is important that the measurement be performed quickly and accurately and that errors due to noise and distortion be minimized.

Various apparatus have been constructed according to the prior art which measure the transfer function of a linear device. Exemplary of such prior art apparatus is that disclosed by Edwin A. Sloane in his U.S. Pat. No. 3,973,112 which was issued on Aug. 3, 1976, and that disclosed by Sloane et al in U.S. Pat. No. 4,047,002 which was issued on Sept. 6, 1977. Typical prior art apparatus have provided pole and zero measurements which have been inherently erroneous due t nonlinearities in the response of the device being analyzed and due to other noise on the measured data.

In guidance with the illustrated preferred embodiment of the present invention, a pole and zero analyzer is disclosed which performs the pole and zero measurement quickly and accurately and which corrects for noise-induced errors in the measurement. The pole and zero measurement is initiated by the application of a desired stimulus signal, such as random or Gaussian noise, to the device. The stimulus and response signals are sampled in the time domain and are transformed to the frequency domain via a Fast Fourier Transform so that the auto-spectrum of the stimulus signal and the cross-spectrum of the stimulus and response signals may be measured. In order to minimize pole-zero measurement error caused by noise and non-linearities in the device response, an ensemble of stimulus and response signal measurements may be made and the auto- and cross-spectra may be measured as ensemble averages. The measured transfer function of the device is determined from the cross- and auto-spectra and the noise level on the measured data is estimated from the ensemble averages of the stimulus and response signals. Measurement time delays may be removed as required.

The measured transfer function is fitted to an estimated transfer function comprising a rational fraction of numerator and denominator Chebyshev polynomials in the variable, s. A weighting function is determined which may be used to emphasize certain portions of the transfer function for the purpose of increasing the accuracy of the pole and zero measurements. The coefficients of the numerator and denominator polynomials are then found as the weighted least squares fit of the measured transfer function data to the estimated transfer function. The quality of the fit of the estimated transfer function to the measured transfer function is determined. If the fit is insufficient, the orders of the numerator and denominator polynomials are varied, new coefficients are determined and the fit is again tested. When a sufficient fit is achieved, the Chebyshev numerator and denominator polynomials of the estimated transfer function are converted to ordinary polynomials and a root solver is used to find the roots of the two polynomials which yield the poles and zeroes of the estimated transfer function. The poles and zeroes may be displayed as desired by the device designer.

BRIEF DESCRIPTION OF THE DRAWINGS

FIG. 5 shows an idealized model of the device to be tested and measurement noise.

FIG. 9 shows various matrix definitions used in the analyzer shown in FIG. 1.

FIG. 10 shows a partitioned matrix used in the analyzer shown in FIG. 1.

DETAILED DESCRIPTION OF THE PREFERRED EMBODIMENT

Figure 1:
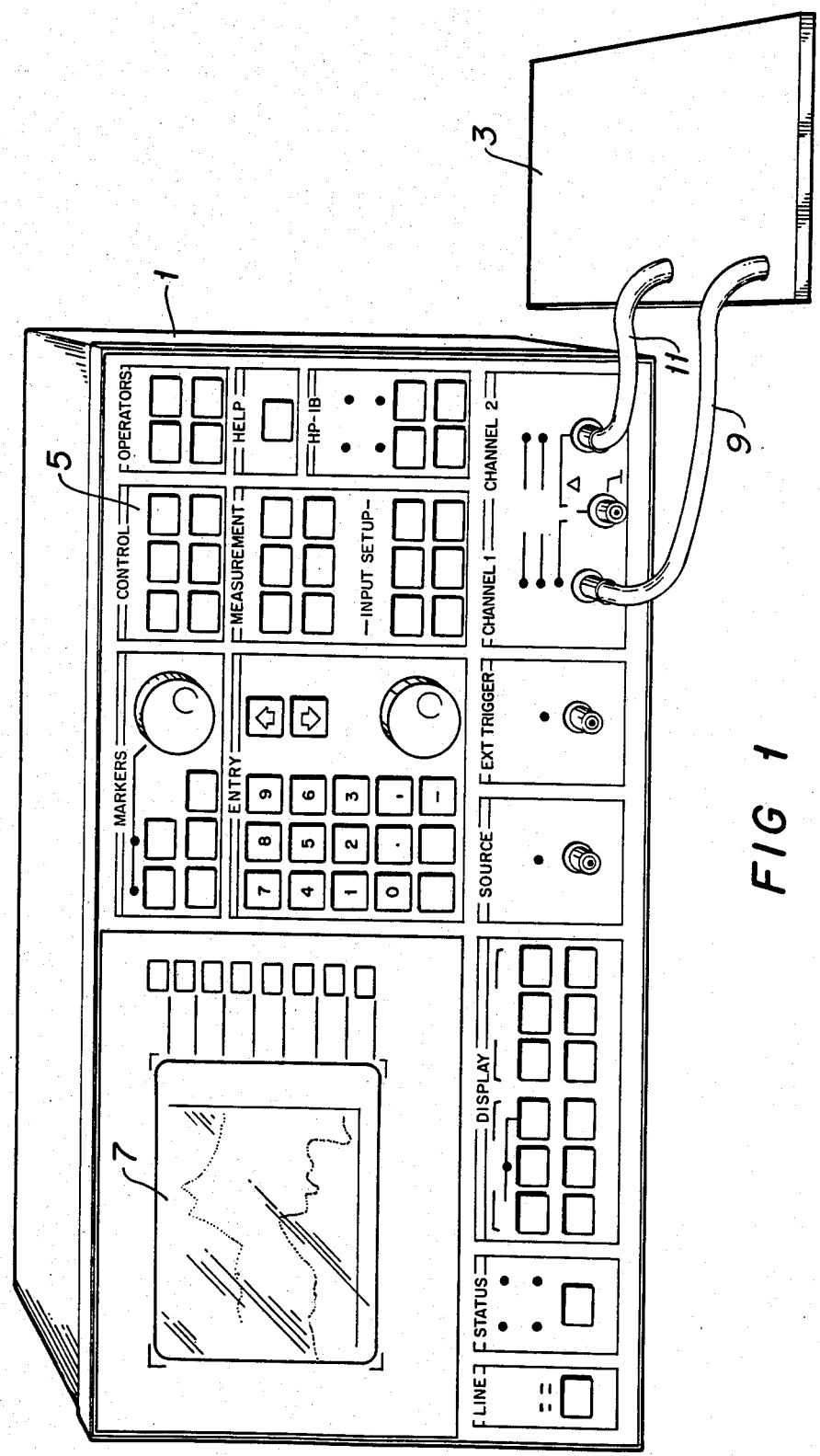
FIG. 1 shows a noise corrected pole and zero analyzer which is constructed in accordance with the preferred embodiment of the present invention.

FIG. 1 shows an analyzer 1 which is constructed in accordance with the preferred embodiment of the present invention. A stimulus signal x(t) is applied through a cable 9 to a device 3 and the response y(t) of device 3 is received by analyzer 1 through a cable 11. Device 3 may be any electrical, mechanical or electromechanical apparatus, e.g., a servomotor. If external transducers are used, it is possible to apply mechanical vibrations to device 3 and to monitor the response of device 3 for modal analysis. Various instructions may be input to analyzer 1 by the user through a keyboard 5 and the results of the measurement may be displayed on a display 7 such as a CRT.

Figure 2:
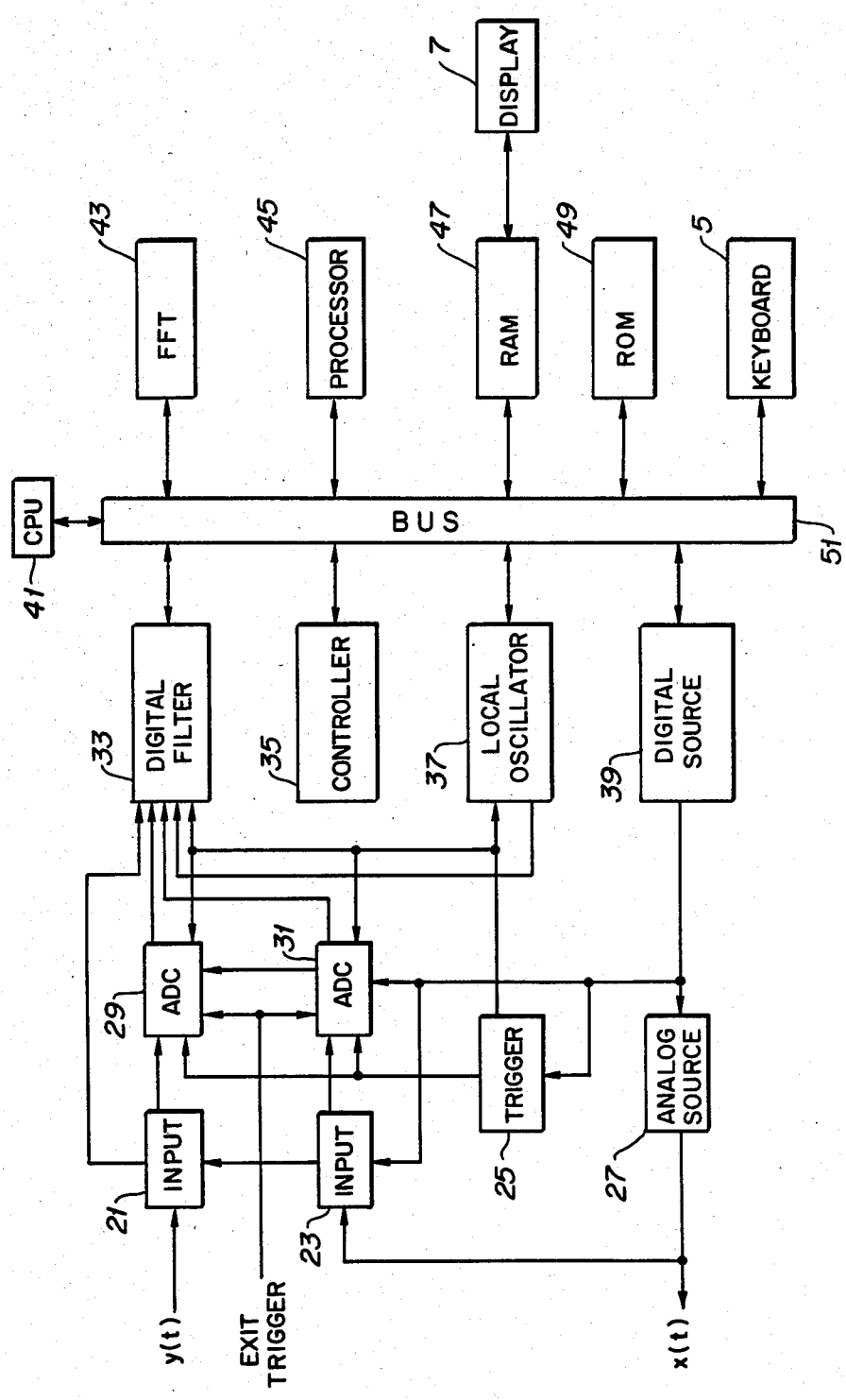
FIG. 2 is a block diagram of the analyzer depicted in FIG. 1.

FIG. 2 is a block diagram of analyzer 1. An analog source 27, driven by a digital source 39 under user control through keyboard 5, generates a stimulus signal x(t) which is applied through a cable 9 to device 3. Both the stimulus signal x(t) and the response signal y(t) are received through input channels 21, 23 and are digitized by analog to digital converters 29, 31 at a sample rate set by local oscillator 37. A digital filter 33 may be used to reduce aliasing errors on sampled $x(t_j)$ and $y(t_j)$. Fast Fourier Transformer (FFT) 43 is used to transform the stimulus and response signals to the frequency domain signals X(f$_j$) and Y(f$_j$) which may then be stored in RAM 47. Floating point processor 45 is used to determine the cross- and auto-spectra of X(f$_j$) and Y(f$_j$) and to measure the amount of noise on Y(f$_j$) if ensemble averages are taken. Processor 45, under control of CPU 41, is then used to measure the poles and zeroes of the transfer function of device 3 as is discussed hereinbelow. A bus 51, which may comprise, e.g., a dual bus system, is used for data and command transport.

Figure 3:
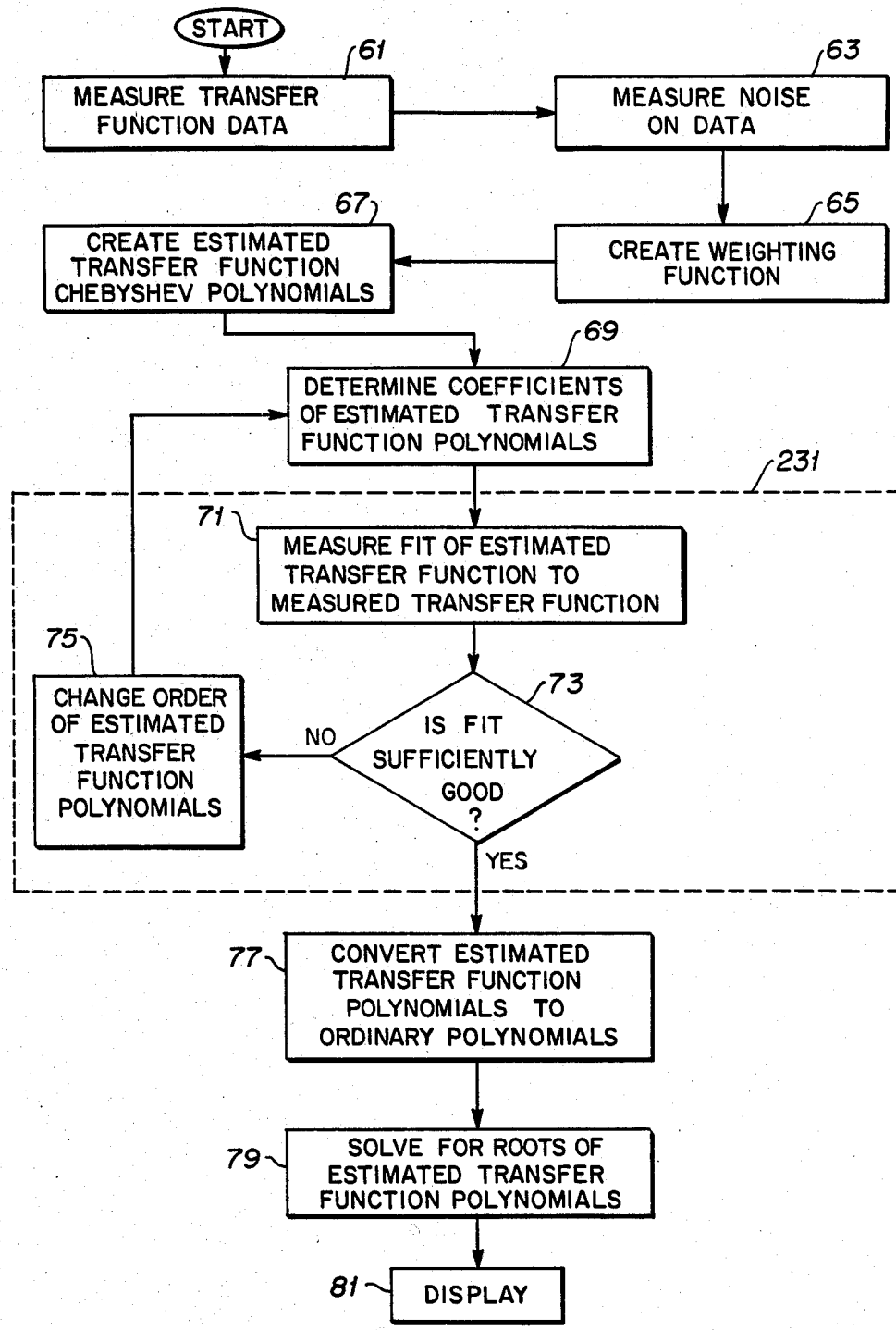
FIG. 3 is a flow chart of the operations performed by the analyzer depicted in FIG. 1 during an analysis of the poles and zeroes of the transfer function of a device being tested.

FIG. 3 is a flow chart of the operations performed by analyzer 1 during the measurement of the poles and zeroes of the transfer function of device 3. In initial step 61, stimulus signal x(t) is applied to device 3 and response signal y(t) is recorded. The two signals are digitized and transformed to the frequency domain as X(f$_j$) and Y(f$_j$). The stimulus and response measurements may be repeated a number of times so that the auto- and cross-spectra may be measured as ensemble averages to decrease the effects of noise and non-linearities in the response of device 3. The auto- and cross-spectra are measured and, in step 63, the measurement variance is determined for an estimate of measurement noise on the measured transfer function.

In step 67, a recurrence relationship is used to generate the numerator and denominator Chebyshev polynomials, P(s) and Q(s), of the estimated transfer function, H$_E$(s). In step 65, a weighting function is determined for use in weighting the least squares analysis by which the estimated transfer function is fitted to the measured transfer function. In step 69, the coefficients of the two Chebyshev polynomials are determined as the weighted least squares fit of the estimated transfer function to the measured transfer function. In step 231, the actual fit is determined and analyzed for conformance to a set of fit criteria. If the fit is insufficient, the orders of the polynomials are varied and new coefficients are determined. If the fit is sufficient, the Chebyshev polynomials are converted to ordinary polynomials in step 77 and the roots of the ordinary polynomials are found in step 79. The poles and zeroes of the estimated transfer function (the roots of the polynomials) are displayed in step 81 as desired.

The various steps of the flow chart shown in FIG. 3 will be discussed below individually and in detail.

Figure 4:
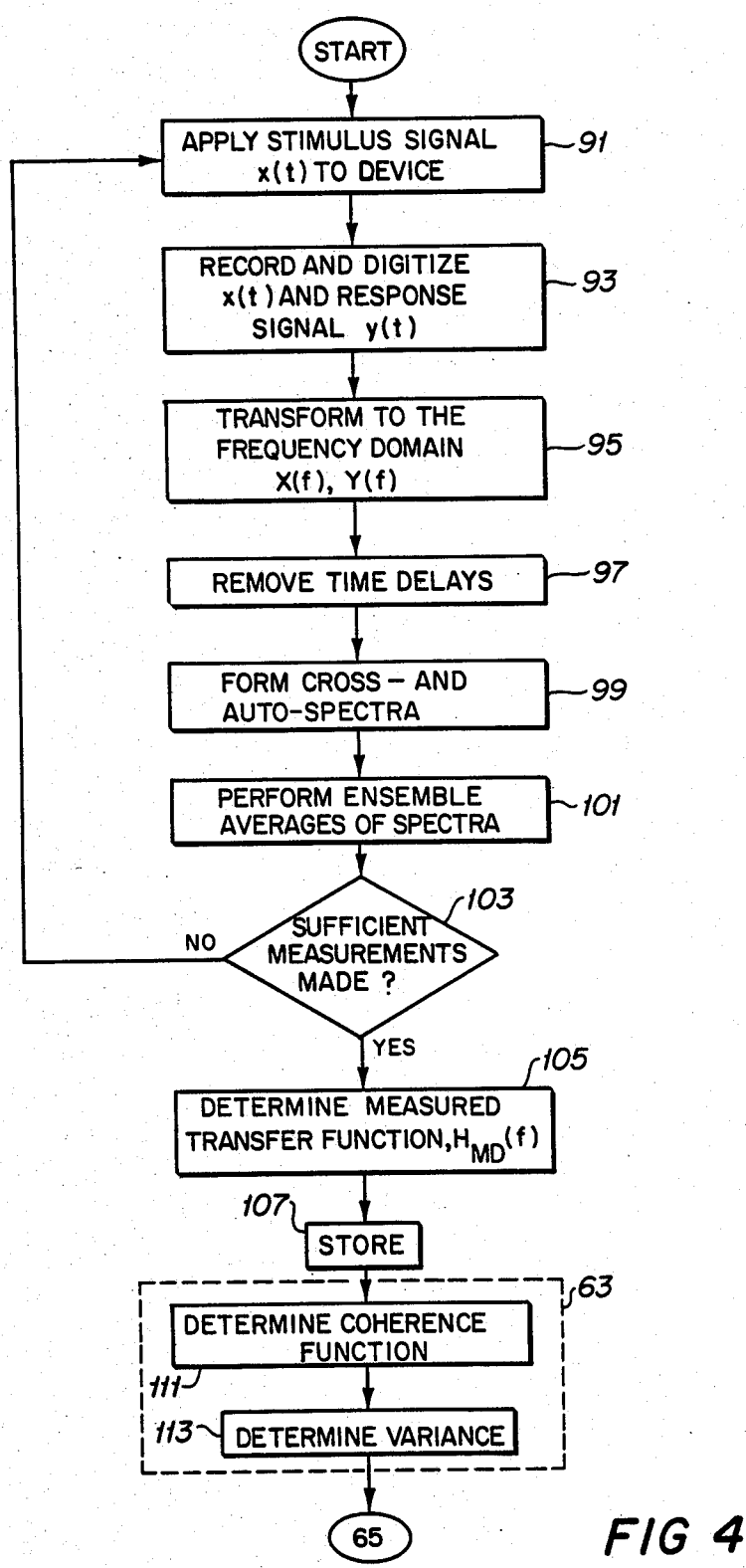
FIG. 4 is a detailed flow chart of one of the steps performed in the flow chart of FIG. 3.

In step 61, the actual transfer function of device 3 is measured. FIG. 4 shows, in sequence, the individual steps of step 61. A stimulus signal x(t) is applied to device 3 and both x(t$_j$) and response signal y(t$_j$) are sampled at a rate f$_s$. Any of a number of signals x(t) may be used to stimulate device 3. In particular, random noise may be desirable so that the effects of minor non-linearities in the response of device 3 may later be removed. In many applications, such as servomotor design, the frequency range of interest may be low, such as DC to 100 KHz. In this baseband case, f$_s$ could be as low as 200 KHz using the Nyquist relationship and ideal components. In reality, filter 33 is non-ideal and some aliasing does occur. This may be compensated for by increasing f$_s$ to, e.g., 256 KHz and/or by disregarding an upper portion of the data in the frequency domain.

In step 95, the time domain signals x(t$_j$) and y(t$_j$) are transformed by a Fast Fourier Transform to X(f$_j$) and Y(f$_j$) in the frequency domain. If 2048 samples are taken of each signal in the time domain, 1024 complex data points in the frequency domain are produced for each signal. It may be necessary to disregard the upper 200 or so frequency domain data points to compensate for aliasing effects. Because each of the frequency data points is complex, it is composed of a real part and an imaginary part which may also be expressed as a magnitude and a phase in polar form. The equations and notation are recited in terms of complex variables unless otherwise indicated.

It is possible that time delays may exist in the measured data because of the physical constraints under which the measurements are made or because of nonideal transducers or other devices used. These time delays should be removed from the data so that undesired virtual poles and zeroes are not injected into the analysis. Removal may be accomplished by any of a number of methods such as by multiplication of the frequency domain data by $e^{i2\pi ft}$ where i is the square root of $-1$ and t is the estimated time delay. Details of this method may be found at page 104 of the second edition of "The Fourier Transform And Its Applications" by Ronald Bracewell.

The measured transfer function, H$_{MD}$(f$_j$) of device 3 may be defined in terms of FIG. 5 which shows that the output of device 3 is dependent upon the input, the transfer function and an additive noise term. Therefore, the transfer function H$_{MD}$(f$_j$) may be defined implicitly by the equation:

$$Y(f) = H_{MD}(f)X(f) + N_F(f), \qquad (1)$$

which may be rewritten, with the overbar defined as ensemble average, as:

$$\overline{YX^*} = H_{MD}\overline{XX^*} + \overline{N_FX^*}, \qquad (2)$$

or, as:

$$H_{MD} = \frac{\overline{YX^*} - \overline{N_FX^*}}{\overline{XX^*}}. \qquad (3)$$

The transfer function of device 3 is defined, in terms of the auto- and cross-spectra as:

$$H_{MD} = \frac{G_{YX}}{G_{XX}}, \qquad (4)$$

where the $\overline{N_FX^*}$ term is assumed to be negligibly small and the auto- and cross-spectra are defined as:

$$G_{XX} = \overline{XX^*}, \; G_{YY} = \overline{YY^*}, \; G_{YX} = \overline{YX^*}. \qquad (5)$$

In order to minimize the effect of the noise term on the measurement of the transfer function, the auto- and cross-spectra may be determined as ensemble averages over a number of stimulusresponse measurements. As the number of measurements in the ensemble is increased, the noise term averages to zero because of the random phase angles of the uncorrelated noise term. If random noise is used for the stimulus signal, then this averaging has the additional effect of linearizing nonlinearities in the response of device 3 because of the lack of correlation between the stimulus signal and any nonlinear response signals. It has been found that an ensemble of between 10 and 1000 measurements has yielded good results, and the number of measurements in the ensemble may be selected by the user. Using the ensembles, the transfer function of device 3 may be measured as the quotient:

$$H_{MD} = \frac{G_{YX}}{G_{XX}}. \tag{6}$$

In step 107 of FIG. 4, $H_{MD}(f_j)$, defined in equation 6, is stored in memory. In step 63, the ensemble coherence of the measured transfer function is measured for later use in correcting the pole and zero measurement for noise errors. In general, variance on a random variable x is defined as:

$$\sigma^2 = \overline{x^2} - \overline{x}^2. \tag{7}$$

Although the variance may be estimated by resort to any of a number of well known methods, the variance may be determined rigorously in accordance with equations 4.92 and 4.93 at page 131 of the March, 1957, New York University Ph.D. dissertation by N. R. Goodman entitled "On The Joint Estimation Of The Spectra, Cospectrum And Quadrature Spectrum Of A Two-Dimensional Stationary Gaussian Process". The equations may be rewritten as Bessel functions of the second kind and may be integrated to yield:

$$\sigma_{RE}^2 = \sigma_{IM}^2 = \frac{1}{2} \cdot \frac{|H_{MD}|^2}{n-1} \cdot \frac{1 - |\gamma|^2}{|\gamma|^2}, \tag{8}$$

where n is greater than one and n is the number of measurements in the ensemble. The coherence function used in equation 8 is defined as:

$$|\gamma|^2 = \frac{|G_{YX}|^2}{G_{XX} \cdot G_{YY}}. \tag{9}$$

WEIGHTING FUNCTION

Figure 6:
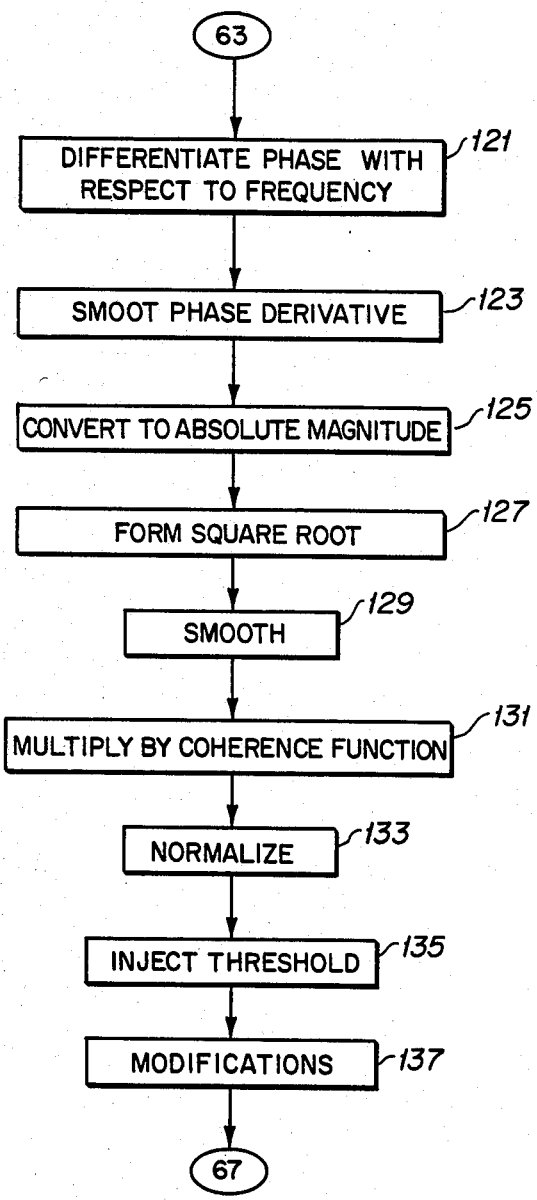
FIG. 6 shows a detailed flow chart of the steps performed during the formulation of the weighting function used in the flow chart of FIG. 3.
Figure 7:
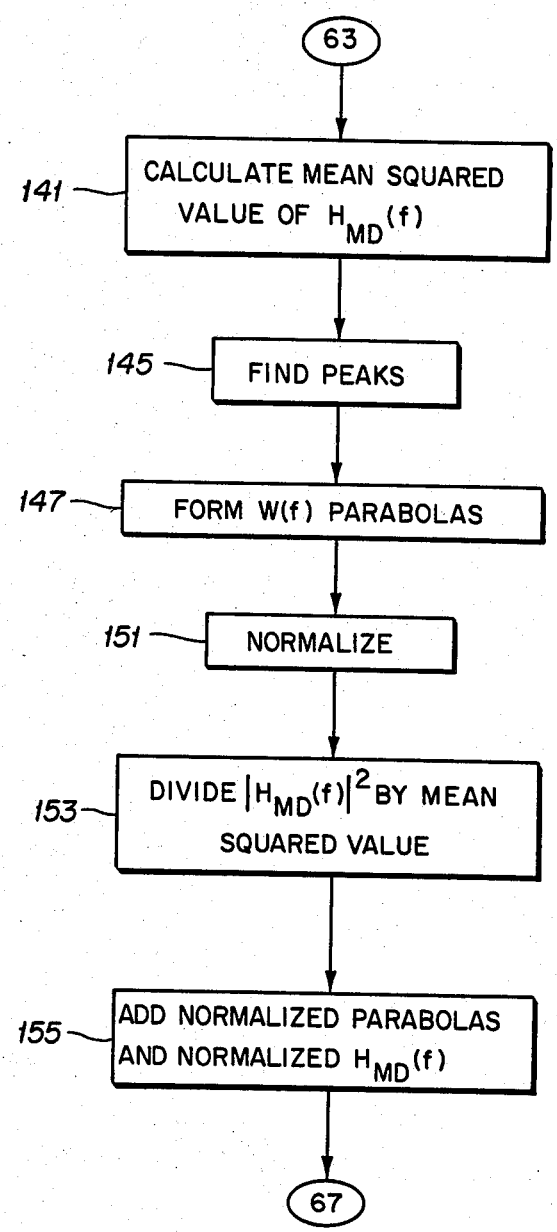
FIG. 7 shows the steps performed during the formulation of an alternative weighting function which may be used.

The user has the option of entering a user-defined weighting function through controls 5. The user-defined weighting function allows the user to emphasize certain desired regions along the frequency axis in light of areas of known high or low measurement accuracy or of particular importance to the user. In that case, the user-defined weighting curve is displayed on display 7 and step 65 need not be performed. Otherwise, in step 65 of FIG. 3, a weighting function W(f) for use in the least squares fit analysis is generated. FIGS. 6 and 7 each show various steps, of step 65, which may be performed to create one of two weighting functions. The weighting function generated by the steps shown in FIG. 6 emphasizes regions along the frequency axis in which $H_{MD}(f)$ is rapidly changing. Thus, the weighted fit is equally good in regions around both poles and zeroes and the weighting function may be best suited for use in servo analysis situations. The least squares fit is a minimization of the sum of the squared error between the measured transfer function $H_{MD}(f_j)$ and the estimated transfer function $H_E(s)$ evaluated at each frequency data point. The weighted error evaluated at each point, where j is the sampling index, may be defined as:

$$E(f_j) = W(f_j)[H_E(i2\pi f_j) - H_{MD}(f_j)]. \tag{10}$$

Although $H_{MD}$ is measured in terms of real frequency points and $H_E$ is in terms of complex s, $H_{MD}$ may be generalized to s and $H_{MD}$ and $H_E$ may be compared and contrasted directly. Persons of ordinary skill in the art will be able to perform the generalization by resort to the procedure of analytic continuation by which analytic functions of s and $i2\pi f$ may be viewed as equivalent.

The total weighted error $\epsilon'$, as defined in the least squares fit analysis is:

$$\epsilon' = \sum_{f_j} |E(f_j)|^2, \tag{11}$$

where the error and weighting functions are evaluated at each frequency point and the summation is taken over the frequency range of interest. The weighting function, W(f), is used to emphasize desired regions of f in the least squares fit analysis. $H_E(s)$ is a rational fraction of two polynomials, $$H_E(s) = \frac{P(s)}{Q(s)}. \tag{12}$$

If it is assumed that the coefficients of P(s) are $c_0, c_1, \ldots, c_m$, and that the coefficients of Q(s) are $d_0, d_1, \ldots, d_n$, then the least squares fit analysis is performed by taking the partial derivative of $\epsilon'$ with respect to $c_0, c_1, \ldots, c_m$, and with respect to $d_0, d_1, \ldots, d_n$, and setting the partial derivatives equal to zero to generate homogeneous equations. This least squares fit analysis permits discovery of the desired minimum weighted error, $\epsilon'$, by simultaneously solving the homogeneous equations. A general discussion of the least squares fit analysis may be found, e.g., at chapter 6 of the second edition of "A First Course In Numerical Analysis" by Ralston and Rabinowitz.

Steps 121-137 of FIG. 6 shows in detail the creation of the weighting function, W(f), outlined at step 67 of FIG. 3. In essence, W(f) is the phase derivative of $H_{MD}(f)$ evaluated at each point along the frequency axis. For three adjacent frequency data points ($x_1, x_2, x_3$), the phase derivative at point $x_2$ is defined to be $ph(x_3) - ph(x_1)$, wherein ph(x) is the phase at data point x. The use of the phase derivative allows maximum weighting at regions of the frequency axis where the probability of a pole or zero of $H_{MD}(f)$ occuring is the highest and causes noise spikes to be only minimally weighted.

In steps 105-107 of FIG. 4, the real and imaginary components of the complex frequency domain measured data points of $H_{MD}(f)$ were measured and stored. In step 121, the phase derivative at each measured data point is determined. In complex logarithm notation, the phase derivative may be expressed as:

$$ph(x_3) - ph(x_1) = Im[\log(x_3) - \log(x_1)] \tag{13}$$

$$= Im[\log(x_3/x_1)]. \tag{14}$$

$$= ph(x_3/x_1) \tag{15}$$

$$= ph\left[\frac{(x_3)(x_1^*)}{(x_1)(x_1^*)}\right] = ph\left[\frac{(x_3)(x_1^*)}{|x_1|^2}\right]. \tag{16}$$

But, only the phase information is desired, so:

$$ph(x_3) - ph(x_1) = ph[(x_3)(x_1^*)] = \frac{d\alpha_2}{df} \tag{17}$$

Thus, it is necessary to evaluate the phase of $x_3x_1^*$. Use of the small angle approximation is convenient and allows computation time to be minimized. The approximation that $ph(x_3x_1^*)$ is equal to $\tan^{-1}[ph(x_3x_1^*)]$ may be used in the region of $-2 < \tan^{-1}[ph(x_3x_1^*)] < 2$ where $\tan^{-1}[ph(x_3x_1^*)]$ is measured in radians. Outside of the region, $\tan^{-1}[ph(x_3x_1^*)]$ is approximated as $+2$ or $-2$. An added benefit of the small angle approximation is that noise on $H_{MD}(f)$ is further minimized because of the limitation on the rate of change of the phase.

Since the phase derivatives obtained at step 121 tend to be noisy, the phase derivative is smoothed at step 123. Smoothing may easily be performed by averaging the individual phase derivative data points with the seven phase derivative data points on either side of the particular data point of interest. Thus, each point on W(f) is really an average of fifteen contiguous phase derivative data points with the result that noise spikes are reduced. While seven points on either side have been used, it has been found that the number may be varied from five to fifteen as desired with good effect. For servo analyses, thirteen points on either side have been used because of the high noise and light damping characteristics of the data. For modal analyses, seven points on either side have been sufficient because of the low noise and highly damped data.

Because only a positive weighting function is desired, the absolute magnitude is taken in step 125. The square root may be taken at step 127. In servo analyses, a smoother weighting function is usually desired so that all data may be used and the square root is often taken. Conversely, in modal analyses, the square root is usually not taken because of the typically higher Q-factor of the devices being analyzed.

In step 129, another smoothing may be made of the weighting function. Smoothing is performed in the same manner as in step 123.

It is also desirable to correct the weighting function to minimize the effect of regions having high noise on the measured data. The coherence function, measured in step 111 of FIG. 4 and defined in equation 9, provides an estimate of the noise on each measured frequency domain data point of $H_{MD}(f_j)$. Multiplication by a noise correction factor, $$\sqrt{\frac{|\gamma|^2}{1.05 - |\gamma|^2}} \tag{18}$$

de-emphasizes regions of high noise where the coherence function approaches zero. Use of the 0.05 factor allows clean data points to be emphasized by a factor of 20 greater than noisy data points. The resulting quantity, including the absolute magnitude of the phase derivative, at each point along the frequency axis, is:

$$\sqrt{\left|\frac{d\alpha}{df}\right| \cdot \frac{|\gamma|^2}{1.05 - |\gamma|^2}} \tag{19}$$

In step 133, the noise corrected weighting function is normalized to 1 to avoid numerical overflow and in step 135 a threshold of 0.02 is injected so that no data is totally disregarded. The weighting function is, thus, defined as:

$$W(f) = \frac{\left(\sqrt{\left|\frac{d\alpha}{df}\right| \cdot \frac{|\gamma|^2}{1.05 - |\gamma|^2}}\right)}{\left(\sqrt{\left|\frac{d\alpha}{df}\right| \cdot \frac{|\gamma|^2}{1.05 - |\gamma|^2}}\right) \text{MAX}}, \text{ or } .02, \text{ whichever is greater.} \tag{20}$$

Finally, in step 137, the user has the option of modifying W(f). W(f), varying from 0 to $+1$, is displayed upon display 7 of analyzer 1 as a function of frequency. If no modification is made by the user, analyzer 1 starts at the highest and lowest frequency points and scans toward the center of the frequency range until a W(f) of at least 0.04 is found at both ends. Data above and below these two end points are ignored. In order to decrease measurement time or in order to avoid elimination of certain desired data, the user can specify the end points by means of two cursors on display 7 and controlled by controls 5.

FIG. 7 shows the various steps, of step 63, which may be used in lieu of the steps shown in FIG. 6 to generate an alternative weighting function. This alternative weighting function may be preferable in modal analysis because of the noise and distortion which often occurs near zeroes in many modal analysis situations. Modal analyses often involve sharper peaks than those involved in most servo analyses. The alternative weighting function tends to locate peaks very accurately and both pole and zero information may be derived.

In step 141, the squared value of the measured transfer function data $H_{MD}(f)$, normalized to one-half of its peak value, is computed and stored. In step 145, peaks in $H_{MD}(f)$ are determined by fitting short line segments to successive portions of $H_{MD}(f)$. Optionally, valleys may also be determined. For 800 data points, three segment lengths typically may be used (16, 32, 64). Segments may preferably be made to overlap by a factor of 2:1 to ensure that no peaks in the data are ignored.

The amplitude of each data point is then subtracted from the amplitude of the associated line segment. The remainder is compared to a threshold value to determined whether or not a valid peak has been detected. A typical threshold of $\sqrt{8}\sigma$ allows comparison of the remainder to the standard deviation at that point and allows elimination of false noise peaks. If the remainders at a predetermined number of successive points exceed the threshold, then a final determination that a true peak has been detected may be made. It has been found that four successive points yields an accurate peak detection.

In step 147, a weighting function parabola is constructed around the center of each peak determined in step 145. The parabola center is located at $(S+T)/2$ wherein S and T are each five points beyond the outermost data points at which the threshold was exceeded for the peak. The maximum height of the parabola is $L/(T-S)$ above the baseline where L is the total number of frequency data points. Thus, the parabolas are constructed with width inversely proportional to height so that neither overly wide nor overly narrow peaks are ignored.

In step 151, the weighting function is normalized by dividing through by the maximum peak value. In step 153, the squared magnitude of the original measured data of $H_{MD}(f)$ is normalized by dividing by twice its peak value measured in step 141. It may be desirable to place relatively less emphasis on regions of greater variance. In this case, multiplication of the negative peaks by the k-th power (k typically being 16) of the quotient of the squared transfer function magnitude divided by the sum of the squared transfer function magnitude and the transfer function variance estimate may be made. Finally, the two functions are merged together in step 155 to form the final weighting function, W(f).

BASIS POLYNOMIAL GENERATION

In step 67 of FIG. 3, the numerator and denominator basis polynomials of the estimated transfer funcion, $H_E(s)$, are generated in the Laplace variable, s. In general, it is possible to generate the two basis polynomials in any form but it has been found that the use of Chebyshev basis polynomials of P(s) and Q(s) has distinct advantages. Numeric ill-conditioning is a pervasive problem in any least squares fit analysis and large numeric errors are probable when finite precision processors are used because of the necessary addition of very large and very small numbers. Chebyshev polynomials have the property of varying in magnitude between plus and minus one in the range of minus one to plus one so that all added terms are of the same relative magnitude and numeric ill-conditioning is avoided. Another advantage inherent in the use of Chebyshev polynomials is that higher order coefficients tend to be decoupled. Decoupling may also be obtained using various orthogonal polynomials which are data dependent and which therefore disadvantageously require polynomial recomputuation for each measurement. See, e.g., the polynomials discussed at section 6.4 of the second edition of "A First Course In Numerical Analysis" by Ralston and Rabinowitz. Further, because of the similarity between Chebyshev polynomials and sine and cosine functions, a Chebyshev product-sum relationship exists by which the Chebyshev polynomial may be formulated so that time-consuming multiplications of Chebyshev polynomials may be replaced by much simpler summations. The product-sum relationship is described, e.g., at page 782 (equation 22.7.24) of the "Handbook Of Mathematical Functions" issued by the National Bureau Of Standards in June, 1964. A typographical error in the NBS equation should be rewritten as:

$$2T_m(x)T_n(x) = T_{n-m}(x) + T_{n+m}(x). \quad (21)$$

The desired P(s) and Q(s) Chebyshev polynomials may easily be generated in accordance with the recurrence relationships given at page 782 of the above-referenced NBS handbook. The P(s) and Q(s) polynomials are polynomials in the complex variable s and may have real, imaginary or complex coefficients. Persons of ordinary skill in the art may easily formulate the complex Chebyshev polynomials using the recurrence relationships which are given for the purely real Chebyshev polynomials. If the measured time data of $H_{MD}(f_j)$ are purely real, as in the baseband case, Hermitian symmetry may be used to facilitate the use of the complex Chebyshev polynomials. If modal analysis is performed, it is useful to discard the constraint of Hermitian symmetry and to modify the basis polynomials. In order to generate the P(s) and Q(s) basis polynomials, it is necessary to have an initial estimate of the orders of the two polynomials. This estimate is equivalent to estimating the number of poles and zeroes of the transfer function. An initial order estimate of 1 for each polynomial allows fitting of polynomials having one or more poles. A higher initial estimate may be made if more information about the device being analyzed is initially available.

COEFFICIENT DETERMINATIONS

Figure 8:
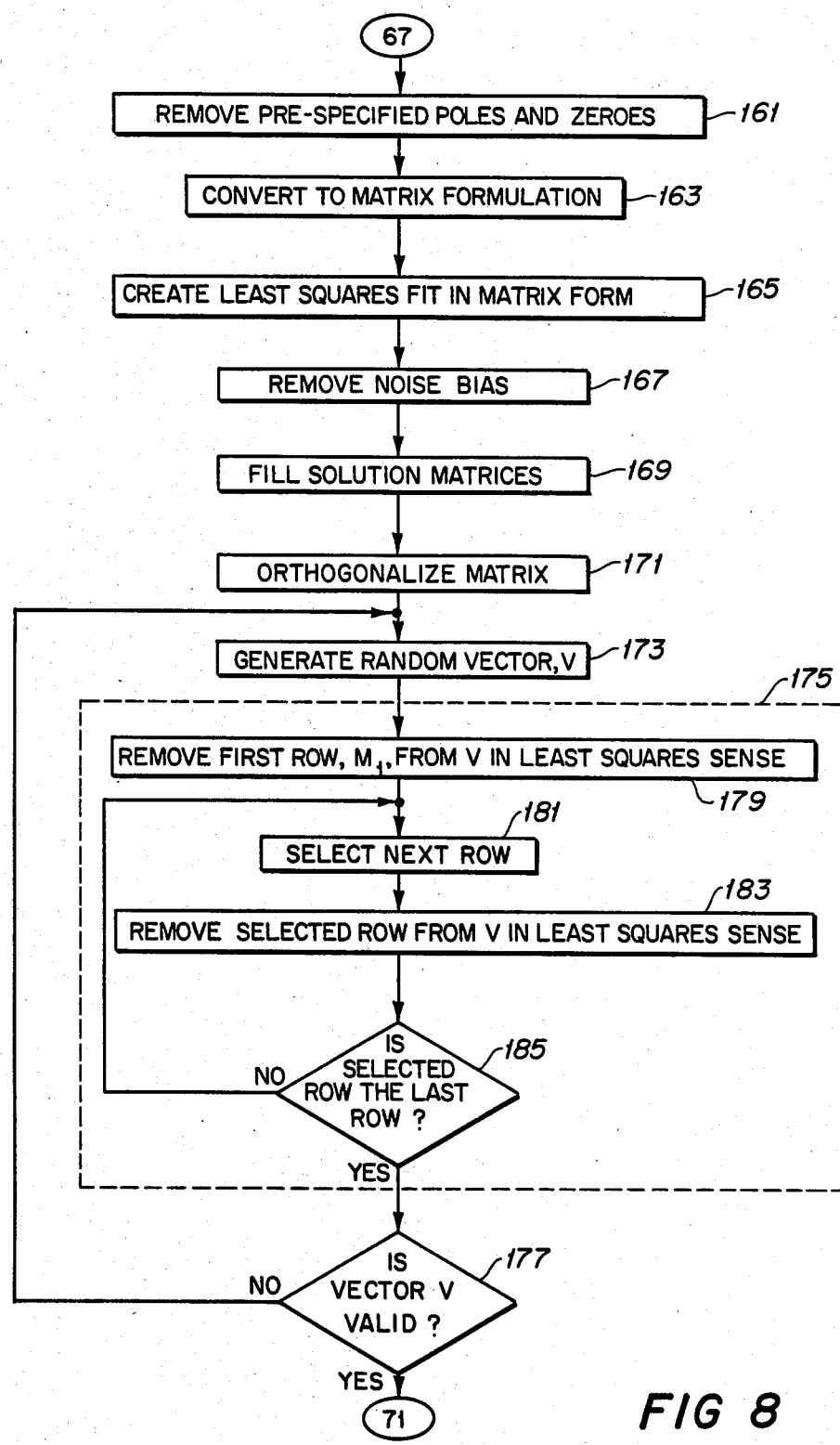
FIG. 8 shows a detailed flow chart of one of the steps performed in the flow chart of FIG. 3.

In step 69 of FIG. 3, the coefficients of P(s) and Q(s) are determined. FIG. 8 shows the various steps of step 69 in greater detail. The point by point error term defined in equation 11 may be rewritten as:

$$E_j = W_j \left[ \frac{P_j}{Q_j} - H_{MDj} \right], \quad (22)$$

where the f notation has been dropped for the sake of convenience and the j subscripts indicate that sampled data along the frequency axis are being used. Multiplication through by the denominator polynomial Q(s) yields:

$$E_j Q_j = W_j [P_j - H_{MDj} Q_j]. \quad (23)$$

Using equation 6, and defining new terms $A_j$ and $B_j$ as:

$$A_j = G_{YX_j} \text{ and } B_j = G_{XX_j}, \quad (24)$$

for simplicity, equation 23 may be rewritten as:

$$E_j Q_j = W_j \left[ P_j - \frac{A_j Q_j}{B_j} \right]. \quad (25)$$

Multiplication through by $B_j$ is optional and would yield:

$$E_j Q_j B_j = W_j [B_j P_j - A_j Q_j]. \quad (26)$$

Finally, if the optional multiplication is not performed, $\tilde{E}_j$ may be defined as:

$$\tilde{E}_j = E_j Q_j. \quad (27)$$

In step 161 of FIG. 8, the user-prespecified poles and zeroes may be removed from the estimated transfer function. Although this is not necessary, prespecification by the user of known poles and zeroes allows the analysis of unknown poles and zeroes to be performed with additional accuracy. Known zeroes are removed from the P(s) polynomial and known poles are removed from the Q(s) polynomial by reference to:

$$U_j = U \prod_{k=1}^{\pi} (s_j - z_k), \quad (28)$$

$$V_j = V \prod_{k=1}^{\pi} (s_j - p_k), \quad (29)$$

$$P(s) = \tilde{P}(s) \prod_{k=1}^{\pi} (s - z_k), \quad (30)$$

$$Q(s) = \tilde{Q}(s) \prod_{k=1}^{\pi} (s - p_k), \quad (31)$$

where $z_k$ are the prespecified zeroes and $p_k$ are the prespecified poles. Equation 27 may now be rewritten in terms of the removed prespecified poles and zeroes as:

$$\tilde{E}_j = W_j \left[ U_j \tilde{P}_j - \frac{A_j V_j \tilde{Q}_j}{B_j} \right]. \tag{32}$$

The $W_j$, $U_j$, $A_j/B_j$ and $V_j$ terms may be correctly viewed as point by point weighting terms (including measured data) which are applied to the estimated polynomials of $\tilde{P}_j$ and $\tilde{Q}_j$. Simplification may be had by defining new terms $W_{pj}$ and $W_{qj}$ as:

$$W_{pj} = W_j U_j \text{ and } W_{qj} = \frac{W_j A_j V_j}{B_j}. \tag{33}$$

Thus, equation 32 may be simplied and rewritten as:

$$\tilde{E}_j = W_{pj}\tilde{P}_j - W_{qj}\tilde{Q}_j \tag{34}$$

In step 163 of FIG. 8, the measured data, weighting functions and estimated transfer function polynomials are converted to matrix notation for ease of analysis using the analyzer 1 shown in FIGS. 1 and 2. This conversion may easily be performed by persons of ordinary skill in the art. Two sets of orthogonal polynomials, $\phi_k$ and $\theta_k$ having coefficients $c_k$ and $d_k$ are generated using the recurrence relationship discussed above and are used to represent $\tilde{P}_j$ and $\tilde{Q}_j$:

$$\tilde{P}_j = \sum_{k=0}^{m-u} c_k \phi_{jk} \tag{35}$$

$$\tilde{Q}_j = \sum_{k=0}^{n-v} d_k \theta_{jk}. \tag{36}$$

Because the Chebyshev polynomials are data independent (and therefore do not have to be redetermined for each measurement), it is preferable to construct $\phi_k$ and $\theta_k$ as Chebyshev polynomials. The two polynomials may be of different orders m and n, but for the sake of convenience the assumption will be made that m=n and both polynomials will be written as $\theta_k$. Persons of ordinary skill in the art will be able to generalize to the case in which m and n are not equal. Equation 35 may be rewritten as:

$$\tilde{P}_j = \sum_{k=0}^{m-u} c_k \theta_{jk} \tag{37}$$

Matrix and vector notation is as shown in FIG. 9. By inspection of the $\theta$ matrix, the first column comprises $T_0(f)$ where $T_k(f)$ is the notation of the k-th order Chebyshev polynomial in f. Thus, $T_0(f)=1$, $T_1(f)=f$, $T_2(f)=2f^2-1$, etc., as discussed above with respect to the Chebyshev recurrence relationship. Each row of the $\theta$ matrix corresponds to a particular data measurement frequency corresponding to the frequencies at which the Fast Fourier Transformed $H_{MD}(f_j)$ data is sampled. Loss of precision is avoided by the use of Chebyshev polynomials instead of ordinary polynomials as is discussed above.

Using the matrix and vector notation definitions, equations 37 and 36 may be rewritten as:

$$\tilde{P} = \theta C, \tag{38}$$

$$\tilde{Q} = \theta D. \tag{39}$$

And, the error equation 34 may be rewritten as:

$$\tilde{E} = W_p \theta C - W_q \theta D. \tag{40}$$

Now, the sum of the squared errors may be written in matrix notation as:

$$\epsilon = |E_j(i2\pi f_j)|^2 = \Sigma_{fj}|P(i2\pi f_j) - Q(i2\pi f_j)H_{MD}(f_j)|^2. \tag{41}$$

$$|W(f_j)|^2 = E^T E = (C^T \theta^T W_p^T - D^T \theta^T W_q^T) \cdot (W_p \theta C - W_q \theta D),$$

where the T superscript denotes the complex conjugate transpose.

In step 165 of FIG. 8, the least squares fit analysis discussed above is constructed in matrix form. The goal is to minimize $\epsilon$ with respect to the elements of the C and D vectors. This minimization is accomplished by differentiating $\epsilon$ with respect to each element of C and D, by then setting the results equal to zero and solving for the satisfying C and D vectors. The resultant equations are given as:

$$0 = \theta^T W_p^T (W_p \theta C - W_q \theta D) = \theta^T W_p^T \tilde{E} \tag{42}$$

$$0 = \theta^T W_q^T (W_p \theta C - W_q \theta D) = \theta^T W_q^T \tilde{E}. \tag{43}$$

For the sake of clarity, equations 42 and 43 may be rewritten as:

$$0 = \theta^T W_p^T W_p \theta C - \theta^T W_p^T W_q \theta D, \tag{44}$$

$$0 = \theta^T W_q^T W_p \theta C - \theta^T W_q^T W_q \theta D. \tag{45}$$

In step 167 of FIG. 8, the noise bias is removed from the least squares fit analysis. From equation 33, the $W_{qj}$ terms contain $A_j$ which are defined in equation 24 as the $G_{YX}$ data at each frequency of measurement. As discussed above with reference to FIG. 5, $G_{YX}$ contains the additive noise term $N_F(f_j)$. In equation 45, the squared magnitude of $W_q$ is taken as $W_q^T W_q$ with the result that the noise on $G_{YX}$ is squared. This squaring process effectively creates a noise bias on each frequency point of measured data because squaring has the effect of yielding a unidirectional bias. None of the apparatus available in the prior art have recognized the existence of noise bias on the pole-zero analysis and no apparatus in the prior art has attempted to remove the noise bias in any way. The effect of failure to remove the effects of noise bias in the least squares fit analysis has been to introduce bias and uncertainty in the determination of the locations of the transfer function poles and zeroes. This is of critical importance where device stability is important because the effect of the noise bias could be to erroneously locate a dominant pole in the wrong half-plane of the s-domain.

The coherence function and the variance are defined in equations 8 and 9 and are obtained from the trispectra measurements may by the analyzer 1. Since the variance is the noise power in terms of squared magnitude, it may easily be subtracted from the $W_q^T W_q$ term shown in equation 46. Thus, noise bias correction is accomplished by subtracting out the variance at each measured frequency point:

$$0 = \theta^T W_q^T W_p \theta C - \theta^T (W_q^T W_q - \sigma^2) \theta D. \tag{46}$$

In step 169 of FIG. 8, solution matrices are constructed and filled to determine the Chebyshev polynomial coefficients for the minimization of the least squares fit analysis. Equations 42 and 43 may be rewritten as equations 44 and 45 wherein noise bias is presumed to have been removed as described above if desired. New functions F, H, $H^T$ and G may be defined as:

$$F = \theta^T W_p^T W_p \theta \quad (47)$$

$$H^T = \theta^T W_p^T W_q \theta, \quad (48)$$

$$H = \theta^T W_q^T W_p \theta, \quad (49)$$

$$G = \theta^T W_q^T W_q \theta, \quad (50)$$

such that the relations, $$GD - HC = 0 \quad (51)$$

$$-H^T D + FC = 0 \quad (52)$$

are true and define the homogeneous system of equations shown as the matrix multiplication of the four part matrix, M, and the two part vector, V, in FIG. 10.

In the case where the analysis of the maximum possible number of poles and zeroes is being made (m=n=40), each of the D and C vectors is 40 elements long and the M matrix contains 6400 elements. Storage of this large number of elements is inefficient and the Chebyshev product-sum relationship described above may be used to minimize the size of the required memory and the amount of time required to regenerate the solution matrix, M. When this data compression is accomplished, the number of elements required to regenerate matrix M is reduced from 6400 to 320. Further, it may be recognized that the third quadrant of the M matrix is merely the transpose of the second quadrant so that only one or the other need ever be fully regenerated for solution of the matrix. The other may then be reconstructed easily from it. And, in addition, only two of the four matrix quadrants need be regenerated at any one time during the solution of the matrix.

The Chebyshev product-sum relationship states that:

$$2T_j T_k = T_{|j-k|} + T_{|j+k|}. \quad (53)$$

Thus, the more specific relationship of:

$$2\sum_f (W \cdot T_j \cdot T_k) = \sum_f (W \cdot T_{|j-k|}) + \sum_f (W \cdot T_{|j+k|}) \quad (54)$$

may be used in the data compression discussed above. The result is that each element of the M matrix is a summation of two other summations in the matrix.

From FIG. 10, it can be seen that the column vector, V, must be orthogonal to each row of the matrix, M. Thus, $M_1 V = 0$, $M_2 V = 0$, ..., $M_n V = 0$, where $M_k$ denotes the k-th row of matrix M. If M is an n by n matrix, at least one row of M must be a linear combination of the other n−1 rows for there to exist an orthogonal solution vector V. In a noise-free system, this could be determined. But, in an actual pole-zero analysis all of the elements of matrix M are contaminated by noise on the measured data to some degree. The effect of the noise contamination is that none of the rows of M is exactly a linear combination of the others so that in the purely theoretical sense no solution vector exists.

Figure 11:
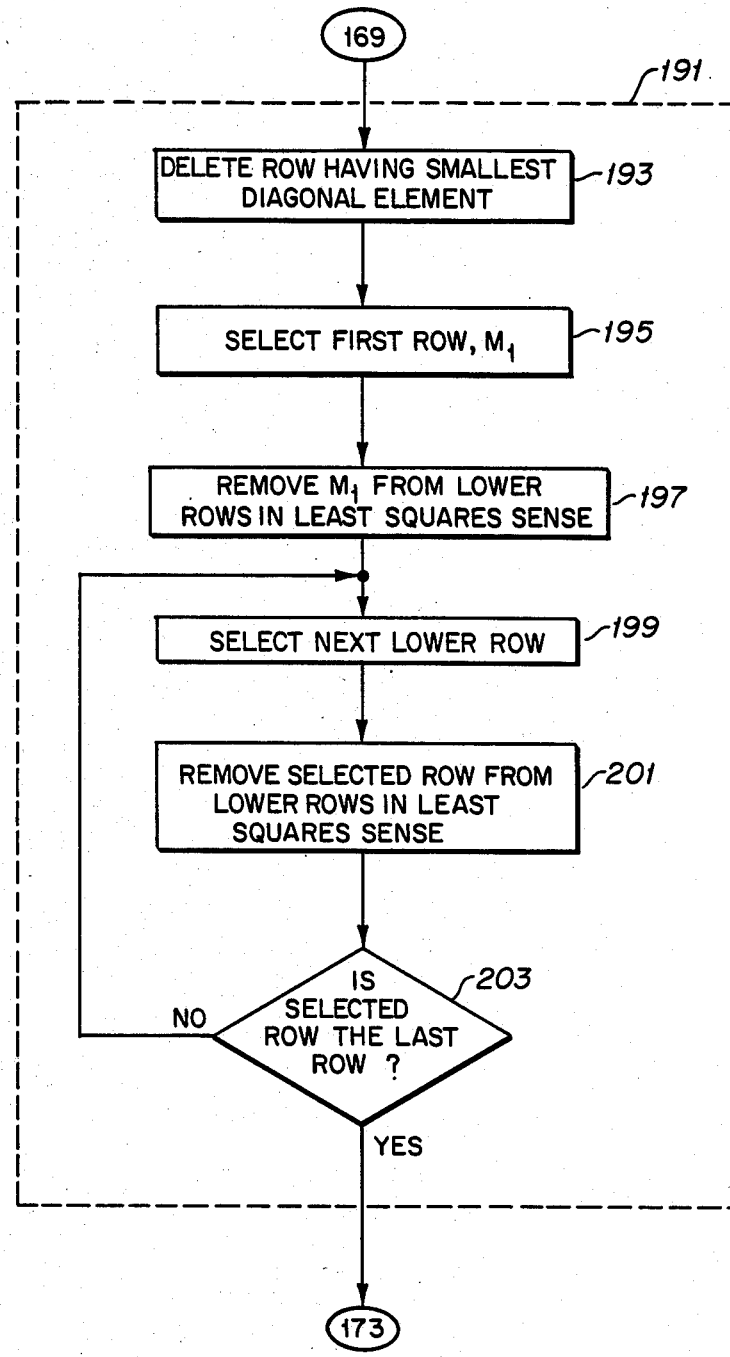
FIG. 11 shows a detailed flow chart of one of the steps performed in the flow chart of FIG. 3.

In step 171 of FIG. 8, the rows of matrix M are orthogonalized relative to each other. FIG. 11 shows the various steps comprising step 171 in detail. In step 193, the row of M which has the smallest magnitude diagonal element is selected and deleted from matrix M. The resulting matrix M is now an n−1 by n matrix. One row is deleted so that it is possible to have an n-length vector V which is orthogonal to the n−1 rows of M. It is desirable to delete that row which is most contaminated by noise so that the deletion has only a minimal effect on the accuracy of the performance of the analyzer 1. Since the basis polynomials being used are Chebyshev polynomials, the diagonal element of each row may be viewed as an estimate of the power of the particular Chebyshev term represented by the row wherein each row comprises a Chebyshev polynomial having an order equal to the row number. By deleting the row having the smallest diagonal value, the row having the least power and, therefore, the largest relative amount of noise contamination, is deleted.

The steps 195-203 of step 191 comprise the orthogonalization of the remaining n−1 rows of matrix M relative to each other using the Gram-Schmidt technique. A detailed description of the Gram-Schmidt orthogonalization technique may be found, e.g., at page 256 of the above referenced Ralston and Rabinowitz textbook. As described in that textbook, the elements of each row are removed successively from each succeeding row in a least squares sense. The result of the orthogonalization technique is that the n−1 rows are orthogonal to each other. Thus, if column vector V of length n is viewed as the n-th row of the n by n matrix made up of vector V and the n−1 rows of M, then a vector V which is orthogonal to the n−1 rows of M does exist. Therefore, the solution does exist.

In step 173 of FIG. 8, a random number generator is used to generate random elements of vector V. In step 175, the Gram-Schmidt orthogonalization technique described above is used to remove each of the n−1 orthogonalized rows of M from vector V. When step 175 is completed, all of the n rows (n−1 rows of M plus the vector V) are mutually orthogonal. There is a very slight possibility that the randomly generated initial vector V could be a linear combination of one or more of the n−1 orthogonalized rows of matrix M. In step 177, the orthogonalized vector V is tested for validity. If V were, in fact, generated as a linear combination of one of the n−1 rows of M, then the orthogonalized vector V would be very small. If this is the case, then V is determined invalid and another random vector is generated. An empirically successfuly criterion for determining validity is to evaluate the magnitude of the orthogonalized V vector and compare it to the roundoff noise level of the processor 45. If the magnitude of V approaches the roundoff noise level, then it is determined to be invalid. For greater accuracy, for a 16 digit processor 45, vector V is determined invalid if its squared magnitude is found to be less than $10^{-12}$.

ORDER SELECTION

Figure 12A:
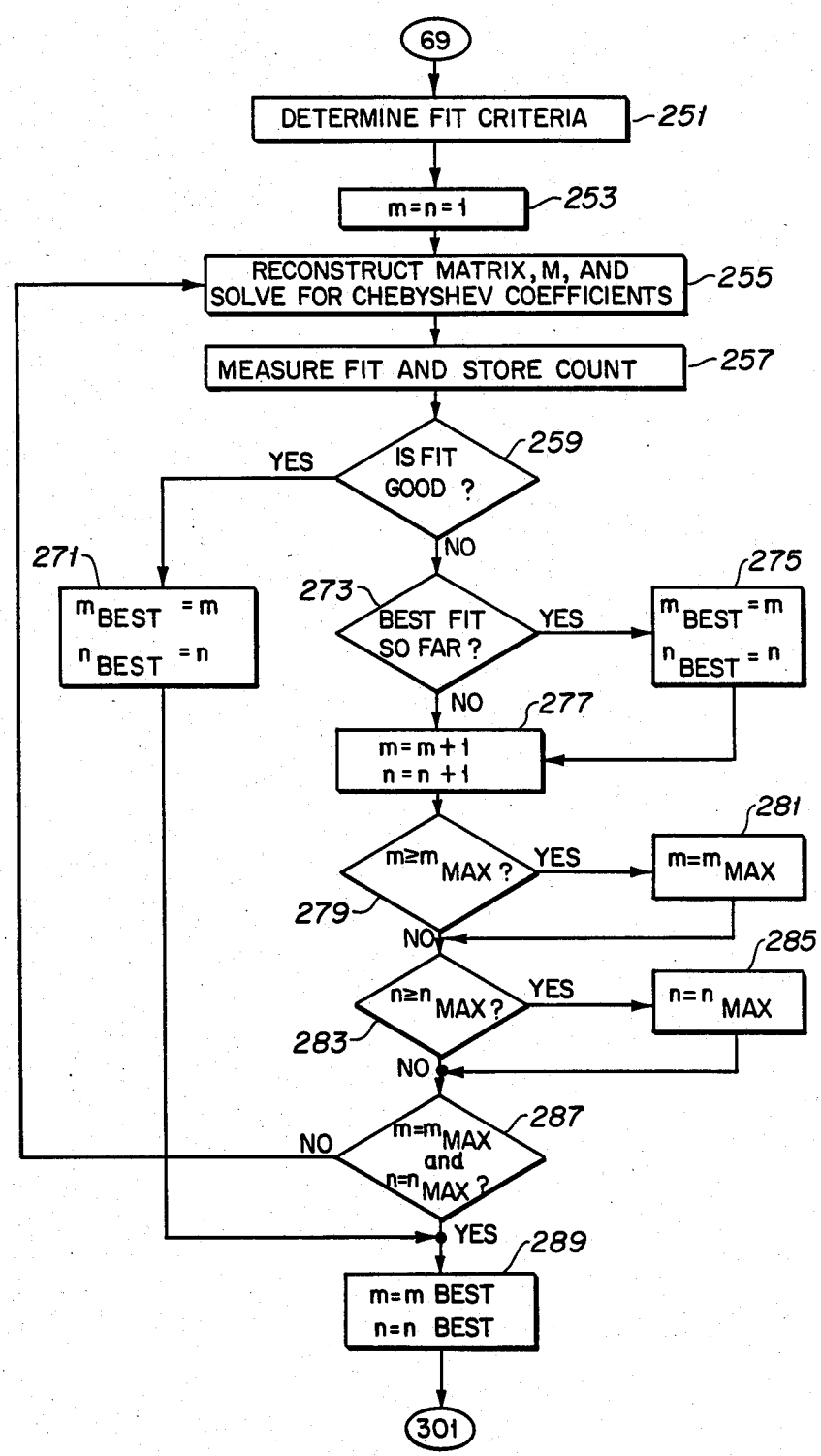
FIGS. 12A-B show the various steps of the automatic order selection step shown in the flow chart of FIG. 3.
Figure 12B:
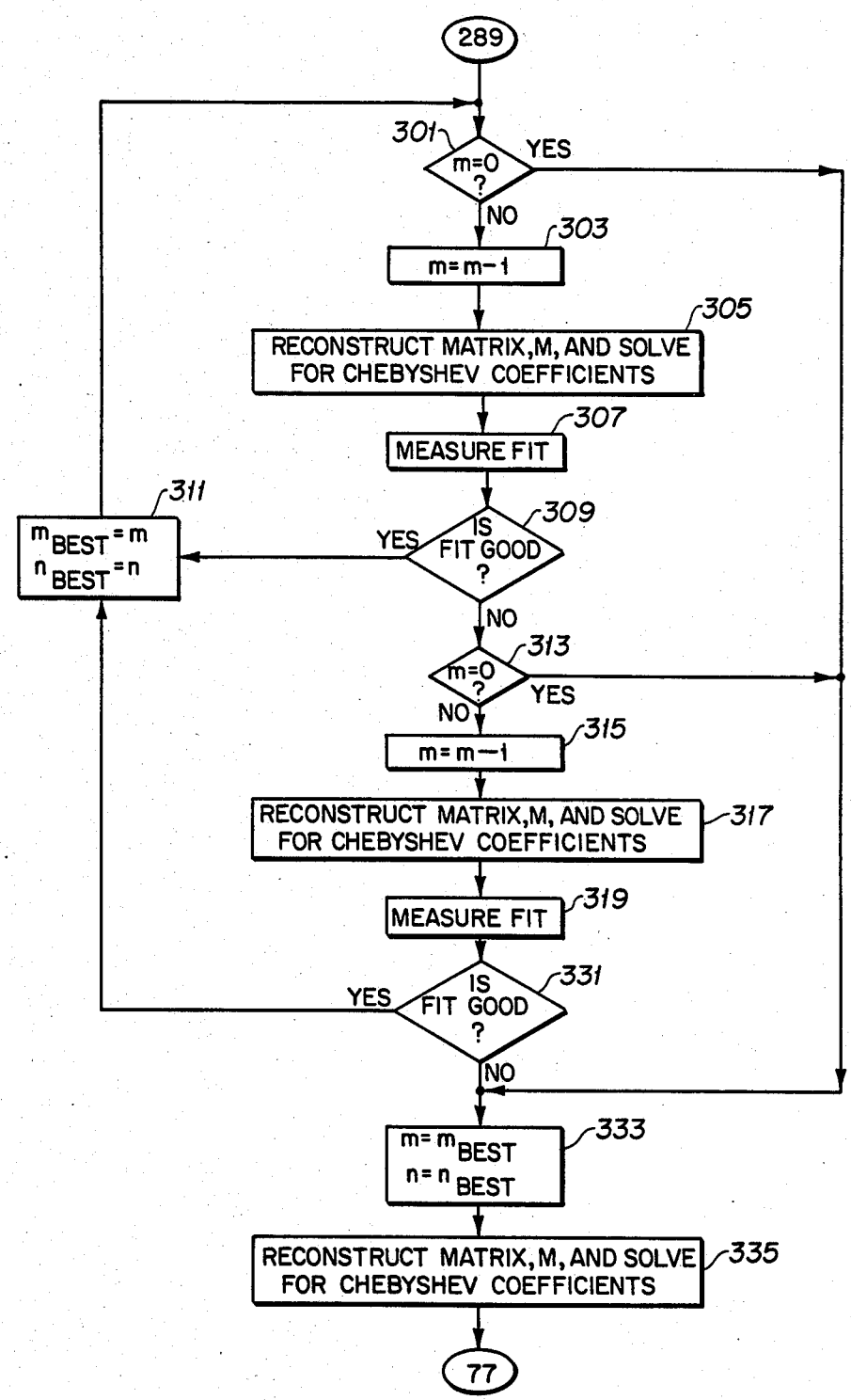

FIGS. 12A-B show the various steps of the automatic order selection which is performed by analyzer 1 and which is shown at step 231 of FIG. 3. Step 231 shows a gross overview of the function of the automatic order selection which is shown in much greater detail in FIGS. 12A-B. The goal of order selection is to increment the pole and zero orders (n and m) until a fit of $H_E(f)$ to $H_{MD}(f)$ meeting certain fit criteria is achieved. Then m is decremented until two consecutive bad fits are discovered. The resulting m and n are the desired orders. If no fit meeting the criteria is ever obtained, the best fit condition is stored and presented.

In step 251, the fit criteria for determination of a good fit are determined. There are a number of criteria which may be used depending upon the particular analysis being performed. One is to test the quality of fit point by point through the frequency range and determine that a good fit is achieved if the total number of points which lie outside of an error limit is less than an acceptance number of points.

The first step in computing the error limit is to calculate the normalized variance at each frequency point from the variance measured above. The point by point normalized variance is defined as the variance at each point divided by the magnitude of $H_{MD}(f_j)$ at each point. $T_j$ is then defined as the greater of 0.01 or the normalized variance at each point. The point by point error limit, $EL_j$, is:

$$EL_j = \pm 10 \cdot T_j |H_{MD}(f_j)|^2 \quad (55)$$

where the magnitude squared term is used to un-normalize the normalized variance or 0.01, whichever is used. The error limit is a window deviating in both directions from $H_{MD}(f)$.

Since the error limit is based on the variance, smoothing may be desired to eliminate random fluctuations. Thirteen point smoothing (average of each point with the six points on either side) may be used. In order to preserve peaks in the original error limit, the greater of the original error limit or the smoothed error limit may be selected point by point for use as the final error limit.

The acceptance number, AN, is the maximum number of points within the frequency range which may be outside of the error limit while still having a good fit. This number may be determined empirically or $$AN = \frac{F_{TOT}}{25} + 4 \quad (56)$$

may be used. $F_{TOT}$ is the total number of frequency points in the frequency range. It should be noted that if error limit smoothing is used, then the highest and lowest six points in the frequency range are ignored in the fit determinations discussed below.

In step 253, an initial order estimate of $m = n - 1$ is made. It should be noted that the user has the option of specifying an initial order estimate other than 1. The user also has the option of specifying m and n so that the steps of FIGS. 12A-B are not performed at all. The user can also specify $m_{MAX}$ or $n_{MAX}$ which limit the maximum permissible values of m and n in the steps of FIGS. 12A-B.

In step 255, the matrix M is reconstructed using the initially estimated orders of m and n. Reconstruction may be made directly if the full matrix parameters were stored. If data compression was used, then construction from the retained maximum 320 parameters may be had with reference to equations 53 and 54 discussed above. Once the matrix is reconstructed, the coefficients of the D and C vectors shown in FIGS. 9 and 10 are solved for as discussed above. In step 257, the estimated transfer function, $H_E(f)$ is constructed from the Chebyshev coefficients as discussed above. The point by point difference between $H_{MD}(f)$ and $H_E(f)$ is measured and compared to the point by point error limit to obtain a count, which is stored, of the number of out of limit points. In step 259, this count is compared to AN to determine if the fit is good.

If the fit is determined to be good, then the current values of m and n are stored as $m_{BEST}$ and $n_{BEST}$ and step 289 is next executed. If the fit is not good, then a determination is made in step 273 of whether or not this is the best fit so far. This determination is made by comparing the count of out of error limits points with prior counts. Prior counts would have been taken if an iteration had been taken from step 287. If a determination is made that this is the best fit so far, then m and n are stored as $m_{BEST}$ and $n_{BEST}$ and m and n are incremented. If this is not the best fit so far, then no storage is made and m and n are incremented.

In steps 279-285, m and n are held to maximum limits which may have been imposed by the user or by the maximum limit of 20 by the analyzer 1. If both m and n are at the maximum limits, then the values of m and n are stored at step 289. If not, step 255 is re-executed and another fit using the incremented m and n is evaluated. Thus, m and n are incremented until either a good fit is achieved or until the maximum limits of both m and n are reached.

In steps 301-303, if the number of zeroes, m, is greater than 0, then m is decremented since both servo and modal systems typically have at least one more pole than zero. Thus, a more accurate fit may be achieved by reducing the number of zeroes and reevaluating the resulting fit. The best fit is deemed achieved at the number of zeroes for which the next two lower numbers of zeroes both have inadequate fits. If, in step 303, it was found that m was equal to zero, then step 333 would be executed next. If not, in steps 305-307, the matrix M is reconstructed for the current values of m and n, the Chebyshev coefficients are solved for and the fit of $H_E(f)$ to $H_{MD}(f)$ is evaluated at each point.

In step 309, the fit is evaluated against the fit criteria. If the fit is good, then m and n are stored and m is again decremented at step 301. If the fit is not good, and if $m = 0$, step 333 is executed. If m is not 0, then m is again decremented in step 315. In steps 317 and 319, a new solution is made and a new fit is evaluated. If the fit is now good, m and n are stored and m is decremented at step 301. If, on the other hand, the fit is again bad, m is reset at step 333 to $m_{BEST}$ which was stored previously. In this case, m is now the value at which the next two decrementations of m resulted in bad fits; n is still the value at which a good fit was obtained before m was first decremented.

Figure 13A:
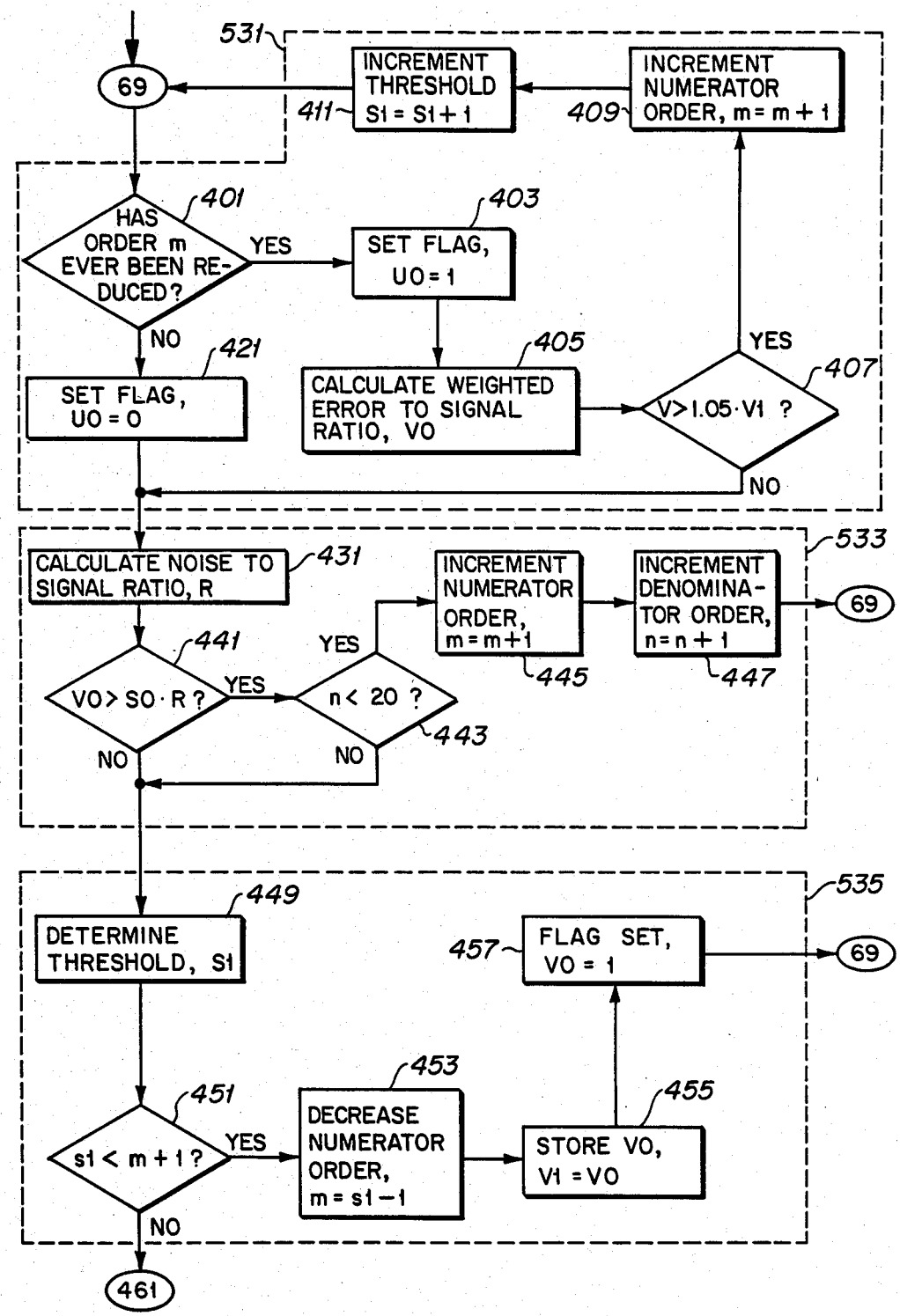
FIGS. 13A-B show the various steps on an alternative automatic order selection which may be used in the flow chart of FIG. 3.
Figure 13B:
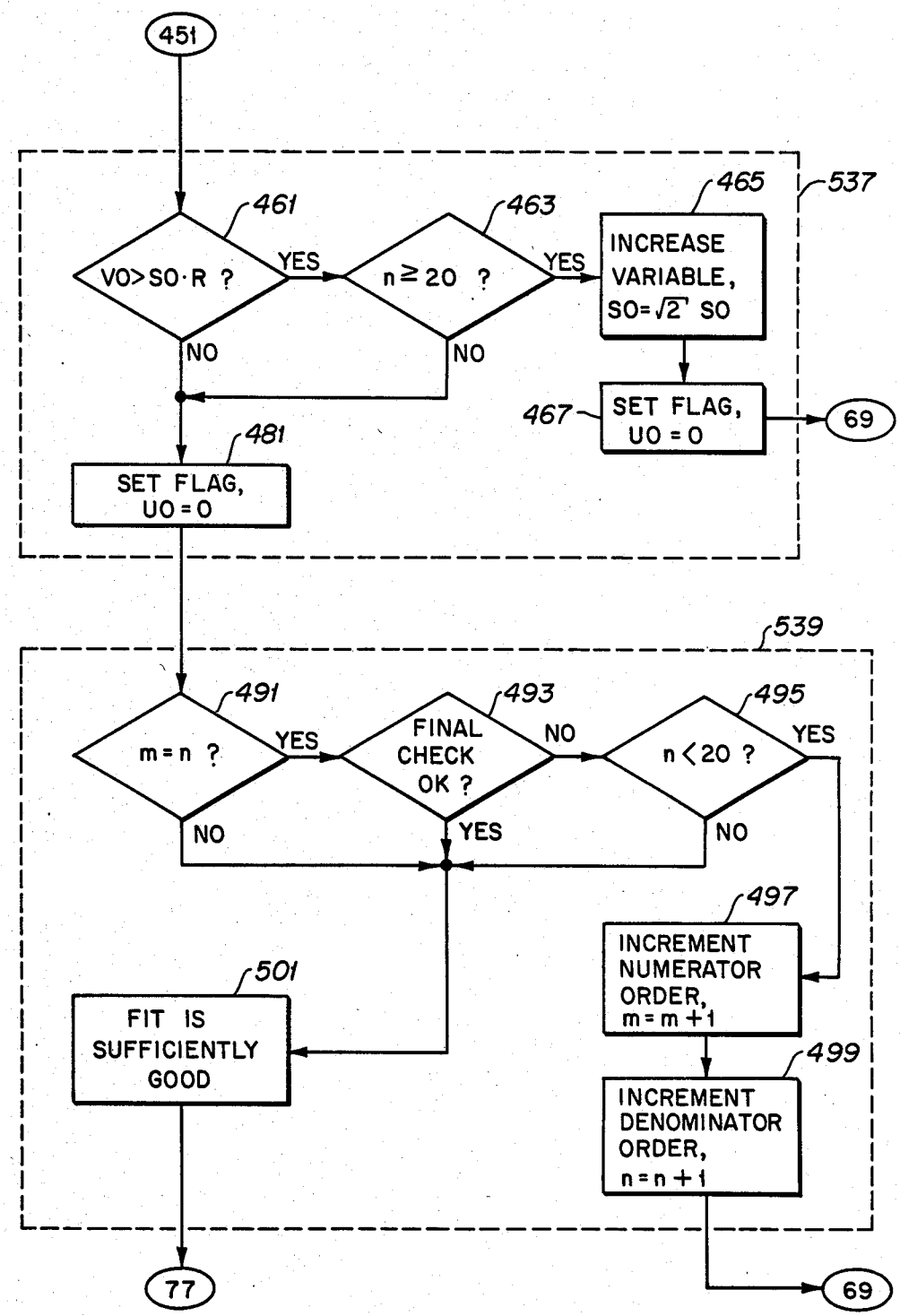

FIGS. 13A-B show the various steps of an alternative automatic order selection which may be used at step 231 of FIG. 3 in lieu of the steps shown in FIGS. 12A-B. In overview, the steps of FIGS. 13A-B may be divided into a number of serial decision blocks which determine whether or not to vary the polynomial orders and to determine new polynomial coefficients. In block 531, the numerator order, m, is incremented and new coefficients are determined if a previous reduction in the order of m caused a degradation of the error to signal ratio. In block 555, both orders m and n are incremented and new coefficients are determined if the error to signal ratio exceeds the noise to signal ratio by a predetermined amount indicating that the error is not caused solely by the noise on the measured data. In block 535, m is reduced, and new coefficients are determined, if it is determined that the higher order coefficients have less than a certain minimal effect on the measured data. In block 537, new data is taken and the entire pole-zero analysis is performed again if an inadequate fit is obtained despite attaining the maximum allowed order n. Finally, in block 539, the fit may be determined to be sufficiently good. If the fit is determined conditionally good in blocks 531-537 and the orders m and n are equal, then the fit is considered sufficiently good. Alternatively, if the error is determined not to be excessively biased when the fit is also considered to be sufficiently good. Otherwise, both m and n are incremented and new coefficients are determined.

In step 401 of block 531, a determination is made of whether or not the order m of numerator P(s) has ever been reduced during the current performance of step 231 of FIG. 3. A flag U0 is set dependent upon the outcome of the determination. If m had previously been reduced, a weighted error to signal ratio, V0, is calculated in step 405 and is evaluated in step 407. V0 is defined as:

$$V0 = \sqrt{\frac{\Sigma_{fj} W(f)[H_E(i2\pi f_j) - H_{MD}(f_j)]^2}{\Sigma_{fj} W(f)[H_{MD}(f_j)]^2}} \quad (57)$$

If V0 is 5% or more greater than the V0 (stored as V1) from the prior fit evaluation with the higher m, then both m and the threshhold (S1, discussed below) are incremented and step 69 is repeated. The determination made in step 407 indicates that the quality of fit (measured by the error to signal ratio) degraded when m was reduced so m is incremented back to its previous value and step 69 is repeated.

In step 431 of block 533, assuming that the error to signal ratio did not increase by 5% or if no reduction of m had previously been made, the noise to signal ratio, R, is calculated. R is defined as:

$$R = \sqrt{\frac{\Sigma_{fj} W(f)[\sigma(f_j)]^2}{\Sigma_{fj} W(f)[H_{MD}(f_j)]^2}} \quad (58)$$

using the definition of variance as the noise power from equation 8 above and using the denominator from equation 57 above. In step 441, the noise to signal ratio is compared to a multiple of the error to signal ratio. The multiple, S0, is used to correlate the quality of fit to the noise on the measured data. S0 has been empirically chosen to be 2, although S0 may be increased in step 465 to allow a looser fit because of higher noise on the measured data.

If the error to signal ratio (V0) exceeds the noise to signal ratio, R, by more than a factor of S0, then the fit is considered to be poor. If the denominator order is less than the maximum allowed, then both m and n are incremented by 1 and step 69 is repeated. This increases the orders of both P(s) and Q(s) to allow a tighter fit of the estimated transfer function to the measured transfer function data. The quality of fit should increase until m or n exceeds the true order of the measured transfer function data. In analyzer 1, the maximum permissible order of each of m and n is 20 ( a total of 40 each for positive and negative frequencies combined). If, in step 443, the maximum denominator order of 20 is reached, then block 535 is entered. Also, if the quality of fit was conditionally determined to be good in step 441, then block 535 is entered.

In step 449 of block 535, a threshold level S1 is determined. S1 is defined such that:

$$T_{S1-1} \leq 1.5 \cdot T0, \quad (59)$$

and $T_{S1-1}$ is the highest magnitude $T_M$ satisfying the inequality of equation 59. $T_M$ is defined as:

$$T_M = \sum_{k=0}^{m} |C_k|^2, \quad (60)$$

where $c_k$ are the coefficients of the numerator Chebyshev polynomial, P(s). T0 is defined as:

$$T0 = \sqrt{\frac{\Sigma_{fj} L(f)[\sigma(f_j)]^2}{\Sigma_{fj} L(f)[H_{MD}(f_j)]^2}}, \quad (61)$$

where the new weighting function L(s) is defined as:

$$L(f) = W(f) \cdot |Q(i2\pi f)|^2 \cdot |H_{MD}(f)|^4. \quad (62)$$

In L(s), the W(s) term allows for emphasis of peaks, the Q(s) term removes the effect of the denominator and the $H_{MD}(f_j)$ term minimizes the effects of areas of small magnitude measured data.

In steps 451 and 453, the numerator order m is decreased to the threshold order, S1−1. It should be noted that the denominator order, n, is never reduced in the flow chart of FIGS. 13A-B. The numerator order is reduced to the threshold in order to ensure that no virtual zeroes are injected by maintaining the numerator at too high a level. S1 is determined so that only relatively ineffective coefficients of P(s) are eliminated so that the order of P(s) is not reduced too far. The factor of 1.5 in equation 59 may be varied to ensure that an optimum number of zeroes are fit.

In step 461 of block 537, the comparison of the noise to signal ratio and the error to signal ratio of step 441 is repeated. If the error to signal ratio exceeds the predetermined multiple of the noise to signal ratio and the maximum allowed order n has been met or exceeded, then a determination is made that the measured data is contaminated. If so, the entire pole-zero analysis is performed again with an increased allowed multiple of the noise to signal ratio, S0, to account for the contaminated data.

If the maximum allowed denominator order is not met or exceeded, then step 491 of block 539 is performed. If the numerator and denominator orders are not equal then the fit is determined to be sufficiently good, the steps of FIGS. 13A-B are completed and step 77 of FIG. 3 is performed. If the numerator and denominator orders are equal, then a final check on the quality of the fit is performed. If the check is successful (or if unsuccessful and the denominator order is equal to or greater than the allowed maximum order) then the fit is determined to be sufficiently good. If the check is unsuccessful and the denominator order is less than the maximum allowed, then both the numerator and denominator orders are incremented and new coefficients are determined at step 69.

An optional final check, at step 493 of block 539, is an analysis of the polarity of the error between $H_E(s)$ and $H_{MD}(f_j)$ at each frequency point of $H_{MD}(f_j)$. The error should be centered about zero and should change polarity frequently if the quality of the fit is sufficiently good.

The final check is performed separately on the real and on the imaginary parts of $H_E(s)$ and $H_{MD}(f)$. The criterion for a successful check is that no more than A1 contiguous error points are of the same polarity, provided that no error point having a magnitude of less than the magnitude of the computational noise of the processor 45 are considered. A1 is selected so that a predetermined number, e.g., 5%, of sufficiently good fits are rejected at step 493 to ensure consistently good qualities of fit. A1 is statistically related to the number of frequency data points used, which is 800 for the analyzer 1. A1 may also be determined empirically.

POLYNOMIAL CONVERSION

In step 335, the Chebyshev coefficients are solved for after the matrix M has been reconstructed for the already determined best fit orders of m and n. Conversion to ordinary polynomials as shown in step 77 of FIG. 3 may now be accomplished.

In step 77 of FIG. 3, the P(s) and Q(s) Chebyshev polynomials of $H_E(s)$ are converted to ordinary polynomials. This conversion may easily be performed by persons of ordinary skill in the art utilizing the Chebyshev recurrence relationship discussed hereinabove with respect to equation 10. The result of the conversion is that P(s) and Q(s) are ordinary polynomials in the complex variable s.

ROOT SOLUTION

In step 79, a root solver is used to find the roots of P(s) and Q(s) which, by definition, are the zeroes and poles of $H_E(s)$. Any of a number of well known root solvers may be used to make this determination. In particular, the root solver used in the Hewlett-Packard Co. model HP-9825 desktop computer, and described at pages 213-224 of the Hewlett-Packard Co. "General Utility Routines" which may be obtained as Hewlett-Packard Co. part number 09825-10001, is effective and useful. An additional discussion of root finders is contained in "A Convergent Algorithm For Solving Polynomial Equations" by J. B. Moore, at pages 311-315 of the Journal of the Association For Computing Machinery, Vol. 14, No. 2, April, 1967.

Finally, in step 81 of FIG. 3, the poles and zeroes of the estimated transfer function $H_E(s)$ are displayed on display 7 of analyzer 1. Any of a number of conventional display procedures may be used effectively and the poles and zeroes may be displayed, e.g., in rectangular or polar form.

I claim:

1. A method for determining poles and zeroes of an estimated transfer function of a device having a measured transfer function, comprising the steps of:
   stimulating the device with a stimulus signal and exciting a response signal;
   detecting the stimulus and response signals;
   computing from the stimulus and response signals the auto- and cross-spectra of the device at each of a plurality of frequencies of interest;
   generating the estimated transfer function as a rational fraction of two Chebyshev polynomials;
   determining an error, at each of the frequencies of interest, between the estimated transfer function and the measured transfer function;
   differentiating the error, at each of the frequencies of interest, with respect to the estimated transfer function;
   equating the differentiated error to zero at each of the frequencies of interest;
   determining coefficients of the estimated transfer function;
   converting the Chebyshev polynomials of the estimated transfer function to ordinary polynomials;
   determining the poles and zeroes of the estimated transfer function as the roots of the estimated transfer function; and
   displaying the poles and zeroes of the estimated transfer function.

2. A method as in claim 1, wherein the step of detecting the stimulus and response signals further comprises the step of transforming the detected stimulus and response signals to the frequency domain.

3. A method as in claim 2, wherein the stimulus signal comprises random noise over the frequencies of interest.

4. A method as in claim 3, wherein matrix techniques are used to perform the steps of differentiating the error, to zero equating and determining coefficients.

5. An analyzer for determining poles and zeroes of an estimated transfer function of a device having a measured transfer function, comprising:
   stimulation means, coupled to the device, for applying a stimulus signal to the device such that a response signal is excited;
   detection means, coupled to the device, for detecting the stimulus and response signals;
   computation means, coupled to the detection means, for computing the auto- and cross-spectra of the device at each of a plurality of frequencies of interest;
   generation means, coupled to the computation means, for generating the estimated transfer function as a rational fraction of two Chebysheve polynomials;
   determination means, coupled to the generation means and to the computation means, for determining an error at each of the frequencies of interest between the estimated transfer function and the measured transfer function;
   differentiation means, coupled to the determination means, for differentiating the error at each of the frequencies of interest with respect to the estimated transfer function;
   equation means, coupled to the subtraction means and to the differentiation means, for equating the differentiated error to zero at each of the frequencies of interest and for determining from the equations coefficients of the estimated transfer function;
   conversion means, coupled to the equation means, for converting the Chebyshev polynomials of the estimated transfer function to ordinary polynomials;
   root solver means, coupled to the equation means, for determining roots of the estimated transfer function; and
   display means, coupled to the root solver means, for displaying the roots of the estimated transfer function.

6. An analyzer as in claim 5, wherein the detection means further comprises a transformer means for Fourier transforming the detected stimulus and response signals to the frequency domain.

7. An analyzer as in claim 6, wherein the computation means, the determination means, the differentiation means and the equation means comprise a processor.

8. An analyzer as in claim 7, wherein the stimulation means is operative for applying random noise to the device.

* * * * *